Aug. 20, 1929.                J. J. GILBERT                 1,724,923
                        SUBMARINE TELEGRAPH SYSTEM
                           Filed Oct. 28, 1927
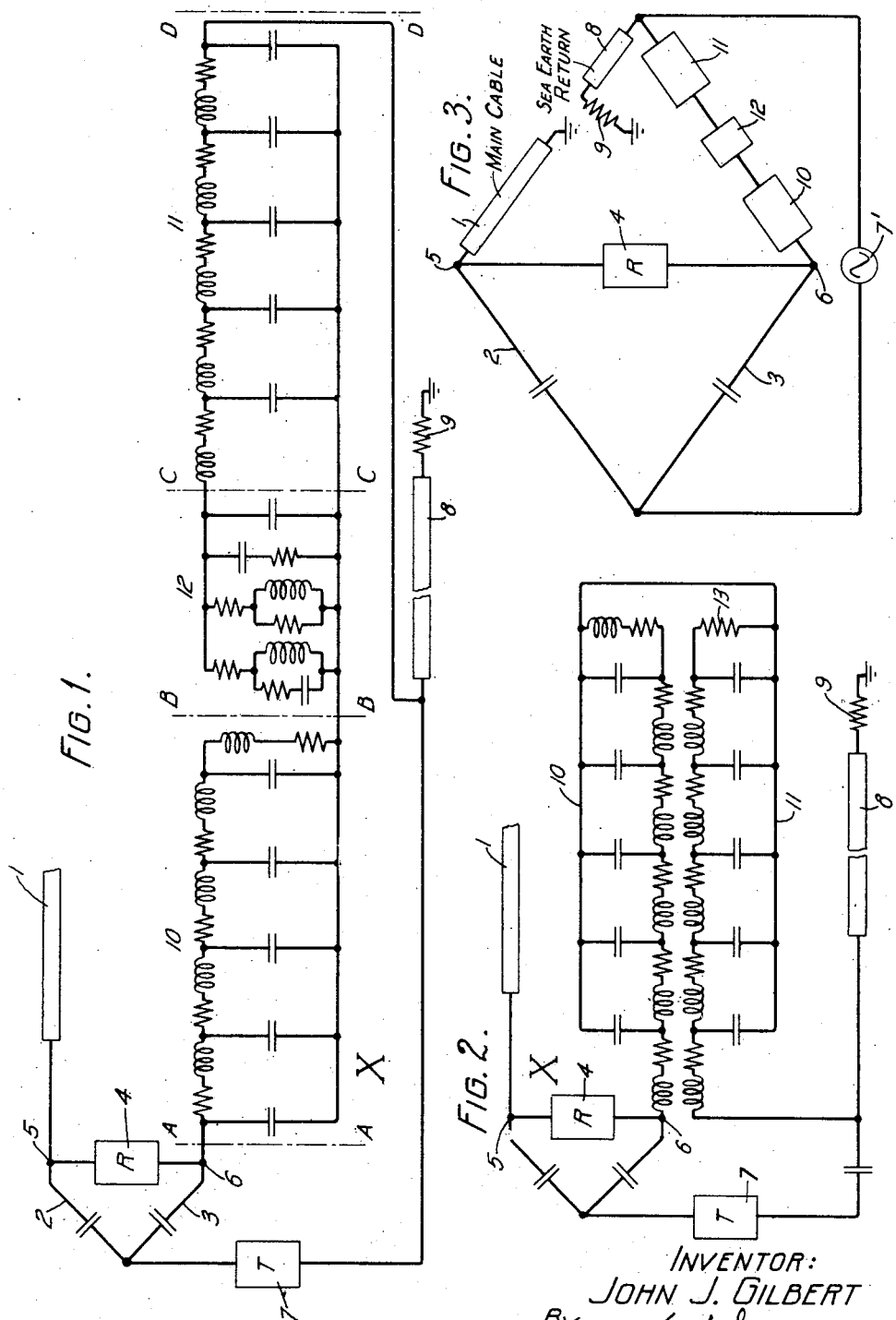
INVENTOR:
JOHN J. GILBERT
BY  E. V. Griggs
              ATTORNEY Patented Aug. 20, 1929.

1,724,923

UNITED STATES PATENT OFFICE.

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK.

SUBMARINE-TELEGRAPH SYSTEM.

Application filed October 28, 1927. Serial No. 229,304.

This invention relates to submarine telegraph signaling systems.

An object of the invention is to improve the balance in a submarine duplex telegraph system, wherein a return cable is connected to sea-earth through a terminating resistance.

In transoceanic submarine telegraph systems in which loaded cables are employed, there is also employed in conjunction with the main cable, a long submarine sea-earth return cable, simulating in electrical characteristics the main cable and having a high resistance sea-earth termination, for diminishing the interference due to extraneous disturbances such as the arrangement disclosed in British Patent 218,261. These systems have heretofore been adapted for simplex operation.

In endeavoring to employ a long sea-earth return cable having a high resistance termination, in a system arranged for duplex operation over a loaded cable difficulty was encountered in developing the artificial line required for balancing the main cable, the sea-earth return cable and the terminating resistance. The main and the sea-earth return cables were balanced as usual by means of a sufficient number of sections of network simulating in impedance the corresponding one-mile sections of the cable, but in balancing the terminating resistance it was found that when a resistance element corresponding in value to the terminating resistance was connected in series with and adjacent to the balancing networks for the cables, considerable distortion in the form of a low frequency surge of large amplitude occurred in the incoming signals and no simple adjustment of the corresponding terminating resistance in the artificial line would reduce this effect materially.

According to the present invention, a substantially perfect balance for the sea-earth terminating resistance is obtained by using a network comprising a combination of resistance, capacity and inductance elements, and inserting it in the artificial line at a point between the balancing networks for the main cable and the sea-earth return cable. With this arrangement, the low frequency surge of large amplitude is eliminated in a very satisfactory manner.

This invention will be better understood by reference to the following detailed description taken in conjunction with the accompanying drawing in which:

Fig. 1 illustrates the terminal equipment of a submarine cable duplex telegraph system comprising a long sea-earth return cable with a high resistance sea-earth termination;

Fig. 2 shows a modification of Fig. 1; and

Fig. 3 shows the manner in which the balancing system in combination with the terminal equipment resembles a Wheatstone bridge arrangement.

Referring to the drawing, Fig. 1 represents a preferred embodiment of the present invention shown in connection with a submarine cable telegraph system arranged for duplex operation in which station X is connected to a distant station (not shown) by means of a submarine cable 1. The equipment at station X is similar to that required at the distant station and, therefore, an explanation of the method of balancing the arrangement shown at station X will suffice for the arrangement at the distant station. Cable 1 is of the loaded type and is shown terminating in a bridge duplex arrangement comprising the ratio arms 2 and 3 and a receiver 4 connected across the conjugate points 5 and 6. The transmission apparatus 7 is connected at one side to the apex of the ratio arms and at the other side to the head end of a sea-earth return cable 8 which extends out to sea, in parallel with cable 1, to a depth which is sufficiently great so that the effect of the disturbing electric waves due to extraneous currents is negligible. This depth is assumed herein to be at a point about 100 miles from shore and, if the return cable is 100 miles in length and has the same electrical characteristics as cable 1, the interference due to extraneous currents will be negligible. Cable 8 matches in impedance the first 100 miles of cable 1 from station X and it is therefore necessary to furnish an additional impedance to match the remainder of cable 1. With a loaded cable, such as cable 1, it is seen in Fig. 6 of the British Patent 218,261, supra, that the characteristic impedance at the frequencies of interest in cable work, is practically a constant resistance with only a small reactance. Thus, a pure resistance 9 inserted between the sea end of cable 8 and the connection to earth will suffice to match the impedance of the remainder of cable 1.

In the artificial line for balancing cables 1 and 8, a sufficient number of network sections, simulating in impedance the corresponding sections of the cables, were employed, and proved satisfactory, the network sections 10 shown between section lines A and B serving to balance cable 1 and those designated 11 between section lines C and D serving to balance cable 8. But it was found in providing an artificial line for the high resistance element 9 that in using a corresponding resistance, that is, one equal in value to the element 9, the incoming signals showed a considerable distortion, and no simple adjustment of the corresponding resistance in the artificial line would reduce this effect materially. This distortion is due to a low frequency surge of large amplitude which appears in the oscillogram of a signal impulse at the end of the interval required for the impulse to travel out to the termination of the sea-earth return cable and back to the head end of the cable.

This distortion is probably caused by an unbalance between the cable and the artificial line in a range of frequencies mid-way between the very low frequencies, that is, less than one cycle per second, at which the resistance plays the predominating part in balancing, and the high frequencies, such as lie within the range of 15 to 50 cycles per second, at which the ratio of inductance to capacity is the most important factor. It is obvious that if a balance can be obtained by adjusting the corresponding terminating resistance to the proper value and then adjusting the capacity of the artificial line to remove surges made up of high frequencies only, and if the receiving apparatus is of such a nature that the low frequency surges in the unbalance would be greatly attenuated, the balance would be quite satisfactory provided there is no point on the cable at which a large irregularity of impedance in the lower frequency range, that is, from about 1 to 15 cycles per second, occurs. This approximate method of balancing is sufficient for a long cable, such as the main cable of the New York-Azores cable, which is disclosed in U. S. Patent No. 1,689,328 granted to A. M. Curtis on Oct. 30, 1928, and which contains no impedance irregularities of large magnitude, but in the case of the sea-earth return cable a rather large impedance irregularity which is fairly near the transmitter is present at the termination of the cable due to the difference in the impedance between the return cable and the terminating resistance element. The reflections caused at this point by the difference in impedance demand that the impedance of the return cable and the return cable's artificial line correspond section by section for at least the range of frequencies effective to cause disturbance in the receiver, but to obtain a perfect match of impedances in this manner, it would be practically very difficult, if not impossible.

Another way of looking at these phenomena is to make certain adjustments in the artificial line for the sea-earth return cable. In order to make the input impedance of the sea-earth artificial line equal to the input impedance of the sea-earth return cable at all frequencies in the signaling range, departures are made at various points along the artificial line from the average values of the electrical constants of the cable. While such adjustments will give a balance between the impedance of the sea-earth return cable and the artificial line as measured from the shore end, they will not necessarily give a balance between the impedances as measured from the sea end of the sea-earth return cable and its artificial line. The amplitude of the impulses, due to the reflection of energy at the points where the sea-earth return cable and its artificial line are joined to their terminal impedances, depends upon the difference between the impedance of the termination and that of the sea-earth return cable or its artificial line as the case may be. Consequently, the reflected impulses in the sea-earth return cable or artificial line will not be necessarily equal.

The impedance of the termination of the sea-earth return cable instead of acting as a pure resistance, behaves like a complex impedance which, for the sake of identification, will be referred to herein as the "apparent impedance." It was found that in a series of tests that this apparent impedance was equal to the actual impedance of the sea-earth return cable termination at low frequencies and to higher values of impedance at the intermediate and the higher frequencies of the signaling range.

A satisfactory method of simulating the apparent impedance of the sea-earth termination was found by inserting a network 12 comprising a combination of inductance, capacity and resistance elements, such as shown between section lines B and C, between the artificial lines for cables 1 and 8, and connecting the whole structure including the artificial lines of cables 1 and 8, between point 6 and the head end of cable 8. This network serves as a satisfactory artificial line for the high terminating resistance 9 and, by suitable adjustment, the elements thereof may be made to have an impedance that is high at high frequencies but which decreases to a value near that of the terminating resistance at low frequencies.

Although it was found that the network 12 shown between the section lines B and C, eliminated the distortion in the incoming signals, it is possible under certain conditions that the distortion may arise due to mutual inductance between cables 1 and 8 and therefore Fig. 2 is shown, to disclose a method of correcting for this distortion if and to the extent that mutual impedance is the cause. In this event, the mutual inductance may be neutralized by arranging the artificial lines for cables 1 and 8 inductively as shown in Fig. 2 in which the upper network 10 represents the artificial line for cable 1 and the lower network 11 represents the artificial line for cable 8. In this arrangement the balancing network shown between the section lines B and C in Fig. 1 may not be needed and in the present instance is not shown. The terminating resistance 9 is indicated as balanced by a pure resistance 13 having a corresponding value.

Fig. 3 shows the impedance of the duplex bridge arrangement of Fig. 1 in the form of a Wheatstone bridge. The parts are numbered correspondingly to those shown in Fig. 1 except that the source of current which corresponds to the transmitting apparatus 7 of Fig. 1 is designated 7'. The artificial lines for the main cable 1, sea-earth cable 8 and the terminating resistance 9 are respectively designated 10, 11 and 12. Assuming that the ratio arms 2 and 3 are equal in impedance and that the impedance of the arm comprising cables 1 and 8 is equal to the impedance of the arm including artificial lines 10, 11 and 12, the potentials at the points 5 and 6 will be the same and therefore no current will flow through the receiver 4 and the arrangement will be in balance.

What is claimed is:

1. A submarine signaling system comprising a main cable, a sea-earth return cable, an impedance element terminating said sea-earth return cable, and a balancing network for said element arranged to simulate the apparent impedance of said element at all frequencies in a material extent of the signaling range.

2. A submarine signaling system, a sea-earth return cable, a resistance element terminating said return cable, and a balancing network for said element arranged to simulate the apparent impedance of said element at all frequencies in the signaling range.

3. A submarine signaling system comprising a main cable, a sea-earth return cable, an artificial line for each of said cables, an impedance element terminating said return cable, and a balancing network for said element located between said artificial lines and arranged to simulate the apparent impedance of said element at all frequencies in the signaling range.

4. A submarine signaling system comprising a main cable, a sea-earth return cable, an artificial line for each of said cables, a resistance element terminating said cable, and a balancing network for said element located between said artificial lines and arranged to simulate the apparent impedance of said element at all frequencies in the signaling range.

5. A submarine signaling system comprising a main cable, a sea-earth return cable, an artificial line for each of said cables, a resistance element terminating said cable, and a balancing network for said element located between said artificial lines and arranged to simulate the apparent impedance of said element at all the frequencies of the range, said balancing network comprising a resistance and at least one reactive impedance element.

6. A system in accordance with claim 5 in which the balancing network includes resistance, capacity, and inductance elements.

7. A submarine signaling system comprising a main cable, a sea-earth return cable, an artificial line for each of said cables, a resistance element terminating said return cable, and a balancing network for said element located at the end of the sea-earth cable artificial line, which end corresponds to the sea end of the sea-earth cable and arranged to give a comparatively high impedance at the high frequencies of the signaling range and an impedance corresponding in value to that of said element at low frequencies, said balancing network comprising resistance, capacity, and inductance elements.

In witness whereof, I hereunto subscribe my name this 24th day of October A. D. 1927.

JOHN J. GILBERT.